United States Patent [19]

Shiraishi et al.

[11] Patent Number: 4,630,154

[45] Date of Patent: Dec. 16, 1986

[54] HEAD PROTECTION MECHANISM FOR DISK DRIVE

[75] Inventors: Yukiya Shiraishi; Takeshi Yamashita, both of Furukawa, Japan

[73] Assignee: Alps Electric Co., Ltd., Japan

[21] Appl. No.: 677,183

[22] Filed: Dec. 3, 1984

[30] Foreign Application Priority Data

Dec. 2, 1983 [JP] Japan .......................... 58-186642[U]

[51] Int. Cl.$^4$ ........................ G11B 5/54; G11B 5/012; G11B 5/016; G11B 21/22

[52] U.S. Cl. ..................................... 360/105; 360/97; 360/99

[58] Field of Search ................................... 360/97-99, 360/86, 104-106, 133; 369/75.2, 261, 262

[56] References Cited

U.S. PATENT DOCUMENTS

| | | | |
|---|---|---|---|
| 4,193,101 | 3/1980 | Carlson et al. | 360/97 |
| 4,275,426 | 6/1981 | Hoffman | 360/99 |
| 4,315,290 | 2/1982 | Kukreja | 360/106 |
| 4,393,424 | 7/1983 | Vidwans | 360/105 |

FOREIGN PATENT DOCUMENTS

| | | | |
|---|---|---|---|
| 58-194167 | 11/1983 | Japan | 360/99 |
| 59-90260 | 5/1984 | Japan | 369/261 |

OTHER PUBLICATIONS

Goplen et al., "Combined Stop and Diskette Seating Mechanism," IBM Tech. Disc. Bull., vol. 19, No. 8, Jan. 1977.

Godsoe, "Interlocked Disk Cartridge Player," IBM Tech. Disc. Bull., vol. 22, No. 11, Apr. 1980.

Primary Examiner—Stuart N. Hecker
Assistant Examiner—Benjamin E. Urcia
Attorney, Agent, or Firm—Guy W. Shoup

[57] ABSTRACT

A flexible disk apparatus has a loading arm which constitutes a part of a magnetic head carriage and moves at least one of a pair of opposing magnetic heads toward the other, and a lever which is pivotally attached to the apparatus for closing and opening a slit through which a flexible disk is loaded and unloaded. The flexible disk apparatus is provided with an interlocking mechanism adapted to actuate the loading arm by means of a cam which is secured to one end of a pivot of the lever which is opposite from the end at which the lever is secured. The cam extends in the same direction as that of the lever. The flexible disk apparatus is further provided with a protection arm which is secured to an intermediate portion of the pivot of the lever and extends normal to the longitudinal axis of the lever. In addition, a protection cam is disposed so as to be pivoted by loading and unloading of the flexible disk and has a surface that engages with the protection arm when the apparatus has no disk inserted therein so as to prevent pivoting of the lever.

5 Claims, 7 Drawing Figures

HEAD PROTECTION MECHANISM FOR DISK DRIVE

BACKGROUND OF THE INVENTION

1. Field of the Invention

The present invention relates to a flexible disk apparatus which magnetically records information on and reproduces the recorded information from a recording surface of a flexible disk (widely employed under a trade name such as 'Floppy Disk'), which is a disk encased in a jacket.

2. Description of the Prior Art

A typical conventional flexible disk apparatus has heretofore been arranged such that, with the disk kept rotating steadily, a magnetic head is brought into contact with the disk by a solenoid mechanism only when information is input or output (this operation will be referred to as "head loading", hereinafter). Since it is recent practice to rotate the disk by a DC motor with a short starting time, however, there is a growing tendency to employ a system wherein the solenoid mechanism for head loading is omitted, and, with the magnetic head always loaded on the disk, the disk is rotated only when information is recorded or reproduced. This system advantageously makes it possible to reduce the power consumption, weight and production cost of the flexible disk apparatus by virtue of the omission of the solenoid mechanism. Further, the system favorably prevents peeling off of the magnetic layer on the disk due to collision of the magnetic head with the disk surface in head loading and consequently permits the life of the disk to be prolonged. However, where the flexible disk apparatus is arranged such that head loading is effected by closing the door to the flexible disk insertion port, although it is possible to obtain the above-described advantages, the following two problems are caused when the door is closed without any flexible disk being inserted in the apparatus:

(1) The upper and lower magnetic heads may collide against each other and may be so damaged as to exert adverse effects on the recording and reproducing properties thereof.

(2) Since the surface of each magnetic head is ground so as to be extremely smooth, the upper and lower magnetic heads cohere with each other and are forcedly separated from each other when the door is subsequently opened. As a result, not only the magnetic heads but also gimbal springs supporting the same may be damaged, so that it becomes almost impossible to carry out normal recording and reproducing operations. In order to solve these problems, we have proposed a flexible disk apparatus in Japanese Utility Model Application No. 89,073/1983 which is provided with a head protecting mechanism adapted to prevent head loading when the apparatus has no flexible disk inserted therein regardless of whether the door is open or closed.

In the technical field of door mechanisms, on the other hand, in place of the conventional mechanism known as the "door-bridge system", a mechanism known as a "lever-cam system" has been proposed, as mentioned in, for example, Japanese Patent Publication No. 13,990/1983 (IBM). This lever-cam system mechanism is arranged such that the bore in the center of the flexible disk is clamped by means of a cam mechanism by pivoting a lever, which is pivotally disposed on the front side of the flexible disk apparatus, to the position where the lever closes a part of the flexible disk insertion port. This mechanism has the following advantages: The disk clamping state is easily made known from the position of the lever; the lever does not obstruct the disk loading and unloading operations and, therefore, the apparatus has excellent operability; and it is possible to cope with the need for a reduction in width of the apparatus without any structural difficulty.

The embodiment of the above-described Japanese Utility Model Application No. 89,073/1983 has the door mechanism which adopts the door-bridge system. FIG. 1, however, shows an example of the door mechanism in which the door-bridge system is replaced with the lever-cam system.

In the Figure, the reference numerals 1, 2 and 3 respectively denote a protection cam, a bail and a lifter. For the other constituent elements, the reader should refer to the embodiment of the present invention which will be described hereinafter.

Describing the operation of the example of the door mechanism shown in FIG. 1, when the flexible disk apparatus has no flexible disk inserted therein, the protection cam 1 restricts lowering of the bail 2 so as to hold magnetic head 21 in its unloaded state. When a flexible disk is inserted, the protection cam 1 is rotated so as to cancel the restriction of lowering the bail 2. When lever 11 is pivoted under this state, a cam 13 secured to the other end of a pivot 12 of the lever 11 pushes down an arm 14, thereby pushing down a clamp arm 24 engaged with the distal end of the arm 14. As the lifter 3 secured to the clamp arm 24 lowers, the bail 2 also lowers, thereby loading magnetic head 21. When the lever 11 is pivoted so as to return to its initial position, the lifter 3 pushes up the bail 2, thereby unloading the magnetic head 21. When the flexible disk is drawn out, the protection cam 1 rotates to return to its initial position where it restricts lowering of the bail 2 again, thereby holding the magnetic head 21 in its unloaded state.

This mechanism has no operational problem and, in particular, has the advantage that there is no portion which is subjected to excessive stress. The mechanism, however, requires a large number of elements which are exclusively used for protection, which involves a disadvantageously high production cost.

This problem of high production cost is substantially solved by arranging the flexible disk apparatus such that the lever is prevented from pivoting when the apparatus has no flexible disk inserted therein. This inhibition of lever pivoting may, however, cause damage to the head protecting mechanism unless the mechanism is arranged so as to adequately resist any force applied by an erroneous operation which would forcedly pivot the lever. On the other hand, if it is intended to realize the arrangement simply by increasing the rigidity of each element, the problem of high production cost arises again. In addition, it is difficult to house the head protecting mechanism in a flexible disk apparatus of narrow width without any obstruction.

SUMMARY OF THE INVENTION

In view of the above-described disadvantages of the prior art, it is a primary object of the present invention to provide a flexible disk apparatus which is provided with a head protecting mechanism that is simple and low in production cost as well as being able to adequately resist the force applied by an erroneous operation, and which has reduced power consumption, weight and cost and additionally permits the disk life to be prolonged.

To this end, according to the invention, there is provided a flexible disk apparatus comprising: an interlocking mechanism adapted to actuate a loading arm by means of a cam which is secured to that end of a pivot of a lever which is opposite to the end at which the lever is secured, the cam extending in the same direction as that of the lever; a protection arm which is secured to an intermediate portion of the pivot of the lever and extends normal to the longitudinal axis of the lever; and a protection cam which is disposed so as to be pivoted by loading and unloading of a flexible disk and has a surface that engages with the protection arm when the apparatus has no disk inserted therein so as to prevent pivoting of the lever.

The above and other objects, features and advantages of the present invention will become clear from the following description of the preferred embodiment thereof, taken in conjunction with the accompanying drawings.

DESCRIPTION OF THE PREFERRED EMBODIMENT

The present invention will be described in detail through one embodiment with reference to the accompanying drawings.

Figure 1:
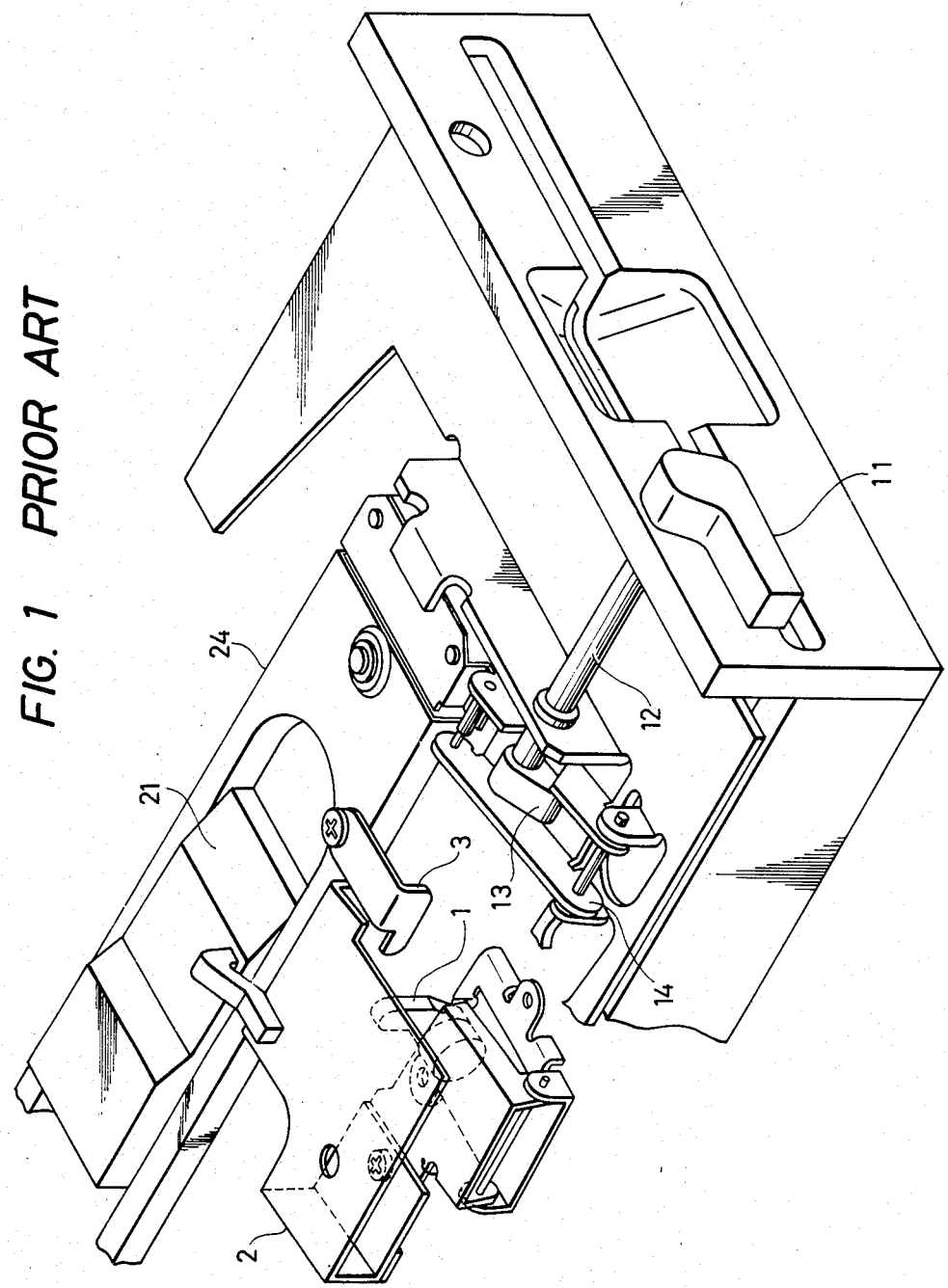
FIG. 1 is a perspective view of an essential part of a conventional flexible disk apparatus.
Figure 2:
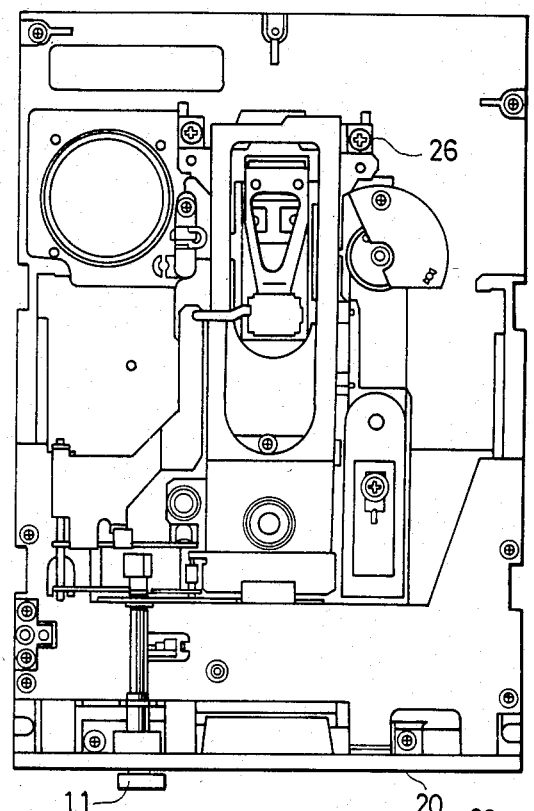
FIG. 2 is a plan view of a flexible disk apparatus in accordance with one embodiment of the present invention.

FIG. 2 is a plan view of one embodiment of the flexible disk apparatus in accordance with the invention, the flexible disk apparatus being in the state wherein a flexible disk is clamped in position.

Figure 3:
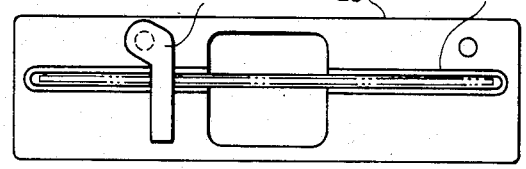
FIG. 3 is a front elevational view of the flexible disk apparatus shown in FIG. 2, particularly showing the clamping position of the lever thereof.
Figure 4:
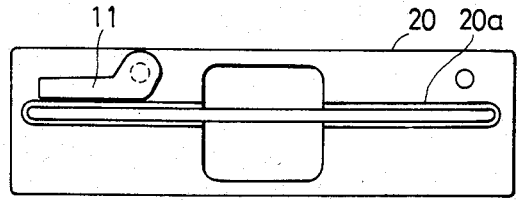
FIG. 4 is a front elevational view of the flexible disk apparatus shown in FIG. 2, particularly showing the unclamping position of the lever thereof.
Figure 5:
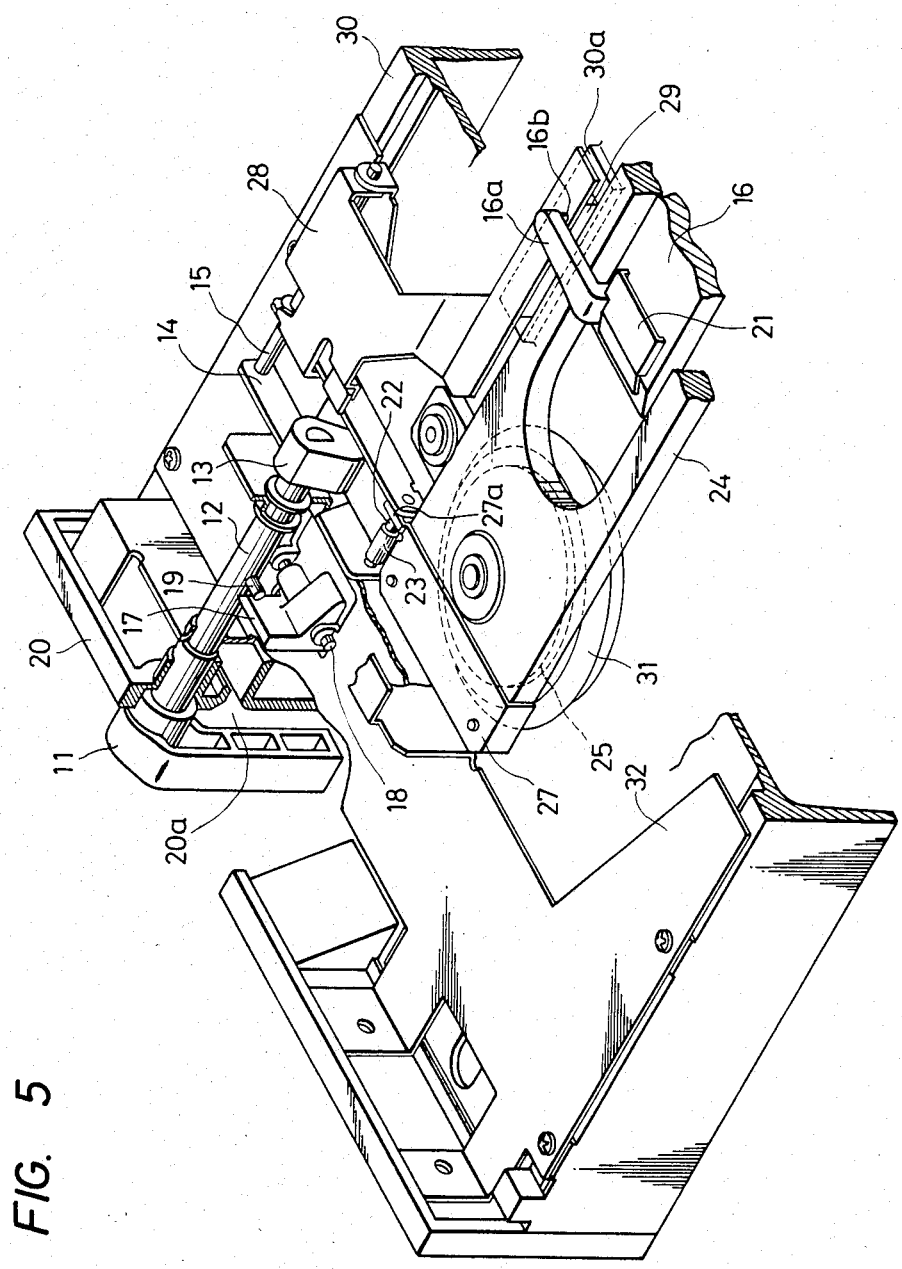
FIG. 5 is a perspective view of an essential part of the flexible disk apparatus shown in FIG. 2.

A lever 11 is pivotally attached to the surface of a front bezel 20 which is provided with a slit 20a through which a flexible disk is loaded and unloaded. The pivotal range of the lever 11 is 90° which is made between the clamping position shown in FIG. 3 and the unclamping position shown in FIG. 4. When the lever 11 is at the unclamping position as shown in FIG. 4, it is possible to load and unload a flexible disk through the slit 20a. FIG. 5 is a perspective view of an essential part of the flexible disk apparatus in the state wherein a flexible disk is clamped in position.

The lever 11 is secured to one end of a pivot 12. A cam 13 is secured to the other end of the pivot 12. A protection arm 19 is secured to an intermediate portion of the pivot 12. The lever 11 and the cam 13 extend in substantially the same direction, while the protection arm 19 extends in the direction of an imaginary line which crosses the longitudinal axes of the lever 11 and the cam 13 at 90°.

An arm 14 and a pad holder 28 are both adapted to pivot about an arm shaft 15. The arm 14 is urged by a first spring (not shown) so as to pivot upwardly. The pad holder 28 is urged by a second spring (not shown) so as to pivot downwardly. Accordingly, the arm 14 and the pad holder 28 pivot in interlocked relation to the pivoting of the cam 13.

A clamper 25 is pivotally disposed at one end of a clamp arm 24 and is urged by a third spring (not shown) so as to press a spindle cup 31. The other end of the clamp arm 24 is secured to a machine frame 30 through a leaf spring 26 (see FIG. 2) such that the clamper mounting end of the clamp arm 24 is raised with the leaf spring 26 employed as a hinge.

A roller retainer 27 having a U-shaped retainer portion 27a is secured to the clamper mounting end of the clamp arm 24. A roller 23 which is rotatably supported on a roller shaft 22 is disposed at the pivoting end of the arm 14. Since the roller 23 and the U-shaped retainer portion 27a of the roller retainer 27 are engaged with each other, the clamp arm 24 pivots in interlocked relation to the pivoting of the arm 14.

A pad 29 made of a material such as sponge is attached to the lower part of the pivoting end of the pad holder 28. A flat surface portion known as a platen 30a is formed on the surface of the machine frame 30 in opposed relation to the pad 29. By holding a magnetic disk cartridge between the pad 29 and the platen 30a, the difference in height between the magnetic disk and the magnetic head 21 is maintained at a constant value.

In the constituent elements of a carriage 16 for the magnetic head 21, an upper arm which retains the upper head is formed with a loading arm 16a for vertically moving the upper head. The loading arm 16a is formed at its distal end with a projection 16b which abuts against the pivoting end of the pad holder 27 as it is raised.

A protection cam 17 is pivotable about a protection cam shaft 18. The protection cam 17 is urged by a fourth spring (not shown) so as to pivot from the lever pivoting permitting position shown in FIG. 7 to the lever pivoting prohibiting position shown in FIG. 6.

It is to be noted that in this embodiment the cam 13, the arm 14, the arm shaft 15, the pad holder 28 and the projection 16b of the loading arm 16a are adapted to constitute an interlocking mechanism in combination.

The following is a description of the operation of the interlocking mechanism.

Referring now to FIG. 5 which shows the flexible disk apparatus in the disk clamping state, a magnetic disk is rotated while being clamped between the clamper 25 and the spindle cup 31. In this state, the projection 16b of the loading arm 16a and the pad holder 28 are separate from each other, and the upper and lower magnetic heads abut the magnetic disk therebetween, that is, are in the loaded state.

As the lever 11 is pivoted through 90° so as to be positioned as shown in FIG. 4, the cam 13 is also pivoted through 90°, thus causing the arm 14 to pivot upwardly. In consequence, the clamp arm 24 is upwardly pivoted through the roller 23 at the distal end of the arm 14, thereby providing a gap between the clamper 25 and the spindle cup 31 which permits the flexible disk to pass. The pad holder 28 also pivots upwardly with the pivoting of the arm 14 such as to upwardly raise the projection 16b of the loading arm 16a, so that the magnetic head 21 is released from the loaded state and is brought into the unloaded state. Thus, the magnetic disk cartridge is free to be loaded and unloaded as desired.

The operation of the protection cam 17 in accordance with the invention will be described in detail.

Figure 6:
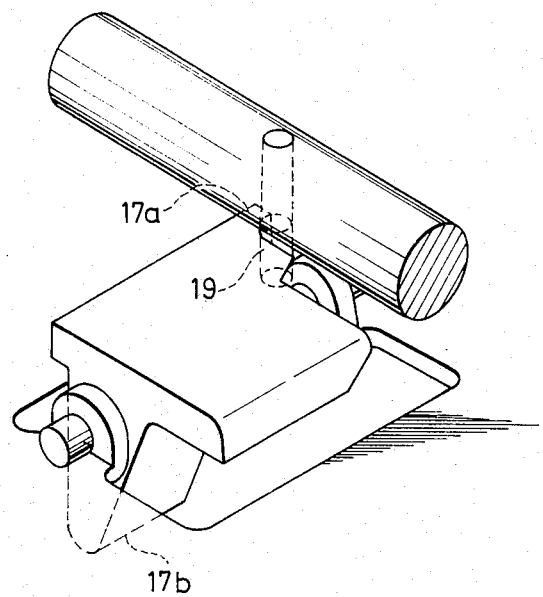
FIG. 6 is a perspective view of a protection cam employed in the flexible disk apparatus shown in FIG. 2 in the state wherein a flexible disk is not inserted in the apparatus.
Figure 7:
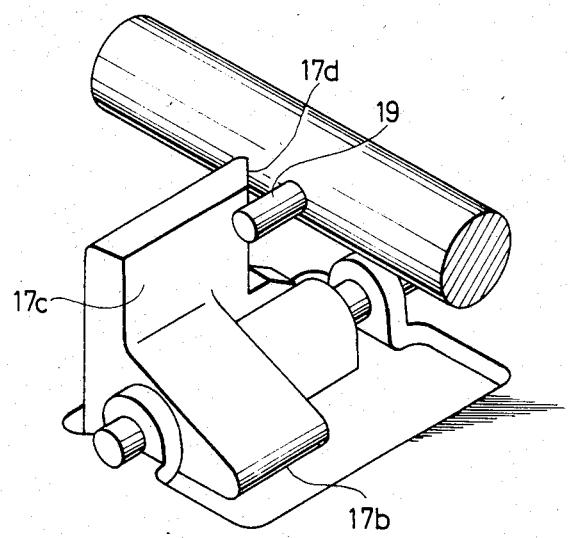
FIG. 7 is a perspective view of the protection cam in the state wherein a flexible disk is inserted in the apparatus and consequently the lever is pivoted to its clamping position.

FIG. 6 shows the protection cam 17 in the state wherein the flexible disk apparatus has no flexible disk inserted therein. In this state, the lever 11 is prevented from pivoting, since the protection arm 19 is blocked by an engagement portion 17a of the protection cam 17. The force which is applied for pivoting the lever 11 under this state acts as a torsional stress relative to the pivot 12, a bending stress and a shearing force relative to the protection arm 19, a compressive force relative to the protection cam 17 and a compressive force relative to a lever frame 32. The bending stress relative to the protection arm 19 is small, since the point of action of the force applied to the protection arm 19 is located near the proximal portion of the protection arm 19. The other forces resulting from the force applied for pivoting the lever 11 are also completely negligible in terms of the force usually applied to the lever 11.

Although the protection cam 17 is urged by the fourth spring so as to pivot clockwise as viewed in FIG. 6, the protection cam 17 is in rest at the position shown in FIG. 6 by the engagement between the protection arm 19 and the engagement portion 17a of the protection cam 17.

As a flexible disk is inserted, the jacket of the flexible disk pushes a flexible disk detection portion 17b of the protection cam 17. Consequently, the protection cam 17 is pivoted. When insertion of the flexible disk has been completed, the protection cam 17 has pivoted to a position intermediate between the position shown in FIG. 6 and that shown in FIG. 7. As the lever 11 is pivoted to the position shown in FIG. 3 under this state, the protection arm 19 slides along a plate portion 17c of the protection cam 17 and a slanting surface portion 17d thereof which is formed continuously with the plate portion 17c, thus bringing the protection cam 17 into the position shown in FIG. 7. At a position intermediate between the positions respectively shown in FIGS. 6 and 7, the same portion of the jacket of the flexible disk is constantly pressed. Therefore, the life of the flexible disk may be reduced, although this pressing force is of the order of several grams only. For this reason, the protection cam 17 is brought into a position, such as that shown in FIG. 7, where the protection cam 17 is not in contact with the jacket of the flexible disk.

As has been described above, the flexible disk apparatus in accordance with the invention has: an interlocking mechanism adapted to actuate the loading arm by means of the cam which is secured to that end of the pivot of the lever which is opposite to the end at which the lever is secured, the cam extending in the same direction as that of the lever; a protection arm which is secured to an intermediate portion of the pivot of the lever and extends normal to the longitudinal axis of the lever; and a protection cam which is disposed so as to be pivoted by loading and unloading of a flexible disk and has a surface that engages with the protection arm when the apparatus has no disk inserted therein so as to prevent pivoting of the lever. Thus, the flexible disk apparatus offers the following advantages:

(a) When the apparatus has no disk inserted therein, the lever is prevented from pivoting, and therefore, the magnetic head is not loaded. Accordingly, it is possible to eliminate the need for any solenoid mechanism and to realize an arrangement wherein the magnetic head is always loaded by pivoting the lever when a flexible disk is inserted.

(b) Since there is no element which generates a dangerous stress when the lever is forcedly pivoted in the state wherein the apparatus has no flexible disk inserted therein, it is possible to allow the elements constituting the greater part of the head protecting mechanism to serve also as the elements constituting the door clamp mechanism. In addition, it is possible to employ lightweight and low-cost elements exclusively for the head protecting mechanism.

Accordingly, it is possible to obtain a flexible disk apparatus which has reduced power consumption, weight and production cost as well as permitting the life of the disk to be prolonged.

What is claimed is:

1. A head protection mechanism for preventing a magnetic head in a magnetic disk drive from being lowered to its disk media engagement position when a disk is not present in a disk receiving region inside the disk drive, comprising:
    spring means linked to said head for urging said head upwards away from said media engagement position;
    a rotable cam means linked to said head for forcing said head downwards toward said media engagement position when the cam means is rotated to a first position and for allowing said head to be urged away by said spring means when the cam means is rotated to a second position;
    a rotable pivot to which said cam means is fixed, the pivot having a protection arm extending therefrom such that a free end portion of the protection arm swings to describe an arc about the pviot when said cam is rotated between said first and second positions; and
    a protection cam pivotally mounted to said disk drive and having a generally L-shaped cross section comprising of a first leg swingable into and out of said disk receiving region of the disk drive such that when a disk is loaded into said disk receiving region, the first leg swings at least partly out of the disk receiving region, and a second leg swingable into and out of the swinging path of the protection arm such that the second leg swings into and blocks a blockable portion of the swinging path of the protection arm when the first leg has swung fully into said disk receiving region;
    said protection arm extending from said pivot at an angle relative to said cam means such that said cam means is in said second position when said protection arm is in the blockable portion of its swinging path.

2. A head protection mechanism according to claim 1 wherein said second position is 90 degree apart from said first position.

3. A head protection mechanism according to claim 1 wherein said protection arm engages the second leg of said protection cam in a unblocked portion of the swinging path of the protection arm to thereby swing said first leg fully out of the disk receiving region of the disk drive such that said first leg does not contact a disk loaded therein when the protection arm has swung to the unblocked portion of its swing path.

4. A head protection mechanism according to claim 3 wherein said second leg includes a slanting surface portion along which said protection arm slides when swinging from the blockable portion of its swinging path to the unblocked portion.

5. A head protection mechanism according to claim 1 wherein said protection cam further includes an engagement portion extending perpendicular to said first and second legs, the engagement portion being swingably engageable with said protection arm when said second leg swings to block said protection arm.

* * * * *